United States Patent [19]

Grainge et al.

[11] Patent Number: 4,494,830
[45] Date of Patent: Jan. 22, 1985

[54] MOUNTING ASSEMBLY FOR OPTICAL ELEMENTS

[75] Inventors: Richard W. Grainge; Dennis Slow, both of Hatfield, England

[73] Assignee: British Aerospace Public Limited Company, London, England

[21] Appl. No.: 405,905

[22] Filed: Aug. 6, 1982

[30] Foreign Application Priority Data

Aug. 13, 1981 [GB] United Kingdom ................ 8124726

[51] Int. Cl.³ .............................................. G02B 7/00
[52] U.S. Cl. ..................................... 350/486; 350/321
[58] Field of Search ................ 350/486, 531, 288, 321

[56] References Cited

U.S. PATENT DOCUMENTS

| 3,704,658 | 12/1972 | Uesugi | 350/247 X |
| 4,331,384 | 5/1982 | Eisler | 350/321 |
| 4,381,884 | 5/1983 | Houle | 350/321 X |
| 4,408,830 | 10/1983 | Wutherich | 350/247 |

Primary Examiner—John K. Corbin
Assistant Examiner—Lynn Vandenburgh Kent
Attorney, Agent, or Firm—Cushman, Darby & Cushman

[57] ABSTRACT

A mounting assembly for optical elements, e.g. mirrors, which require to be adjusted into accurate location within an optical path includes arrangements for effecting bodily displacement of the optical element in both a fore-and-aft sense and in a lateral sense, and for effecting tilting movement in both an elevation and an azimuthal sense, so that such adjustment can be made whereupon the element can be clamped in position.

6 Claims, 2 Drawing Figures

MOUNTING ASSEMBLY FOR OPTICAL ELEMENTS

This invention relates to mounting assemblies for optical elements such as mirrors, prisms, or lenses, for example, which require to be adjusted into accurate location within an optical path and subsequently held in that location.

It is an object of the invention to provide an assembly in which the optical element is not distorted by such adjustment and in which the use of adhesives is avoided which can fail because of chemical or other changes or which can distort the optical element as ageing occurs.

According to the present invention a mounting assembly includes an optical element having spaced end regions, a carrier member having two spaced web regions between which the optical element lies and which carry the end regions of the optical element, first displacement means for displacing the spaced end regions in the same sense with respect to the web regions to effect bodily fore-and-aft adjustment, second displacement means for displacing the optical element away from one of the web regions toward the other to effect bodily lateral adjustment, and tilting means for tilting the optical element with respect to the web regions to effect angular adjustment in elevation, said first displacement means being capable of displacing the spaced end regions differentially with respect to the web regions to effect angular adjustment in azimuth.

Conveniently, the first displacement means comprises twin location members each slidably associated with a web region and connected with one end region of the optical element.

In a first embodiment each location member comprises a slider constrained to slide in guideways formed in its associated web region.

In this case, preferably, the connection between each location member and its associated end region is effected by means of a spigot engaging in a part spherical bearing. Preferably, the second displacement means comprises screw threaded regions on one spigot with nuts engaged therewith one on each side of the part spherical bearing so that screwing the nuts in the same sense urges the spigot bodily axially with respect to the web region.

In a second, alternative, embodiment each location member comprises a generally planar member with an outer peripheral region slidably attached to an associated web region, an inner boss region attached to an adjacent end of the optical element, and flexible regions joining the inner and outer regions. In this case the second displacement means conveniently comprises screw means for urging the optical element bodily laterally, such bodily movement being accommodated by distortion of the flexible region of the location member.

In each embodiment the tilting means includes an arm anchored so as to effect tilting in elevation of the optical element by angular movement relative to a web region.

In the first embodiment the arm is preferably anchored to the optical element itself; it is therefore laterally flexible to accommodate lateral bodily adjustment of the element.

In the second embodiment the arm is attached to a location member and, in moving that, naturally moves the optical element as well.

Two embodiments of assemblies according to the invention are described with reference to the accompanying drawings in which.

Figure 1:
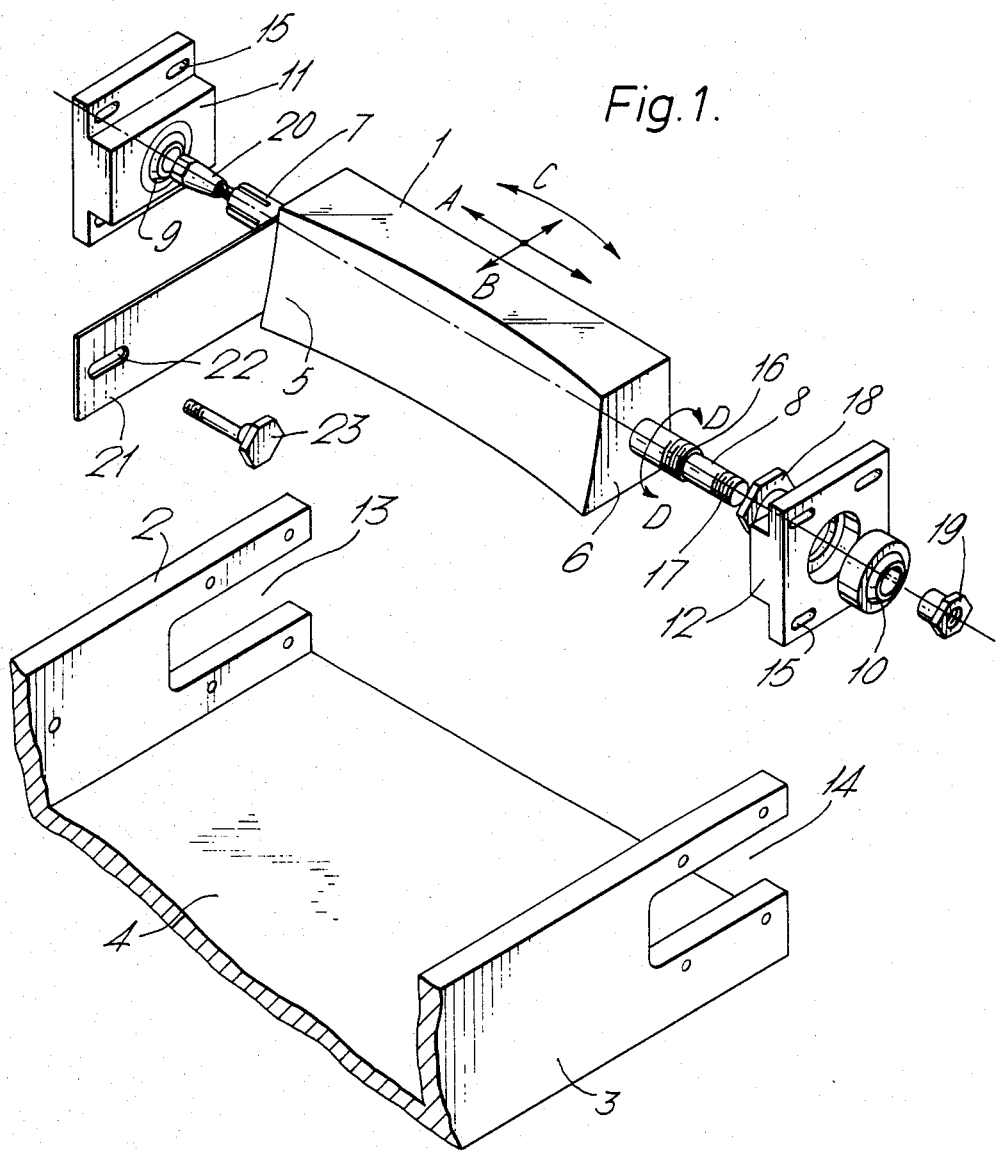
FIG. 1 is an exploded perspective view of one embodiment.

Referring to FIG. 1, an optical element in the form of a part-parabolic mirror 1 of elongate form is mounted between the spaced webs 2, 3 of a carrier 4. The mirror 1 has spaced end regions 5, 6 from which protrude respectively coaxial spigots 7 and 8. The spigots 7 and 8 respectively locate in part-spherical bearings 9 and 10 which are themselves carried in location members comprising sliders 11 and 12.

Guideways 13 and 14 are formed in the webs 2 and 3 respectively and the sliders are constrained to slide in them by means of bolts not shown which extend through slotted holes 15 into the webs.

To effect bodily displacement (by said first displacement means) of the mirror in the fore-and-aft sense, as shown by Arrow B, the sliders 11 and 12 are moved in their guideways in unison, the extent of movement being governed by the length of the slotted holes 15. On accurately reaching a desired position the bolts are tightened thereby clamping the slides to the webs.

The spigot 8 has two screw threaded regions 16 and 17, of which the outboard one 17 is of reduced diameter, each having an adjustment nut 18 and 19, respectively, co-operating with it. That referenced 18 lies inboard of the slide 12 whilst that referenced 19 lies outboard. Screwing of the nuts in the same sense urges the spigot axially to bodily laterally displace the mirror 1 (by said second displacement means) as shown by Arrow A.

To ensure a tight fit by the spigot 7 in its bearing 9 subsequent to such adjustment, the spigot 7 is axially slotted and is provided with an expander in the form of a tapered screw 20.

To effect tilting (that is to say angular) adjustment in the elevation sense, as shown by Arrow D, the mirror 1 carries a lever arm 21 with a slotted aperture 22 at its free end through which an eccentric adjusting screw 23 extends into the web 2.

Rotation of the eccentric 23 causes the arm 21 to be raised or lowered with reference to the carrier 4, pivoting being effected about the common axis of the bearings and spigots.

The slides 11 and 12 can be moved in their guideway individually and hence differentially. Differential movement has the effect of angular adjustment of the mirror in azimuth, that is to say, as indicated by Arrow C.

To accommodate this movement the arm 21 is of a laterally flexible material.

Figure 2:
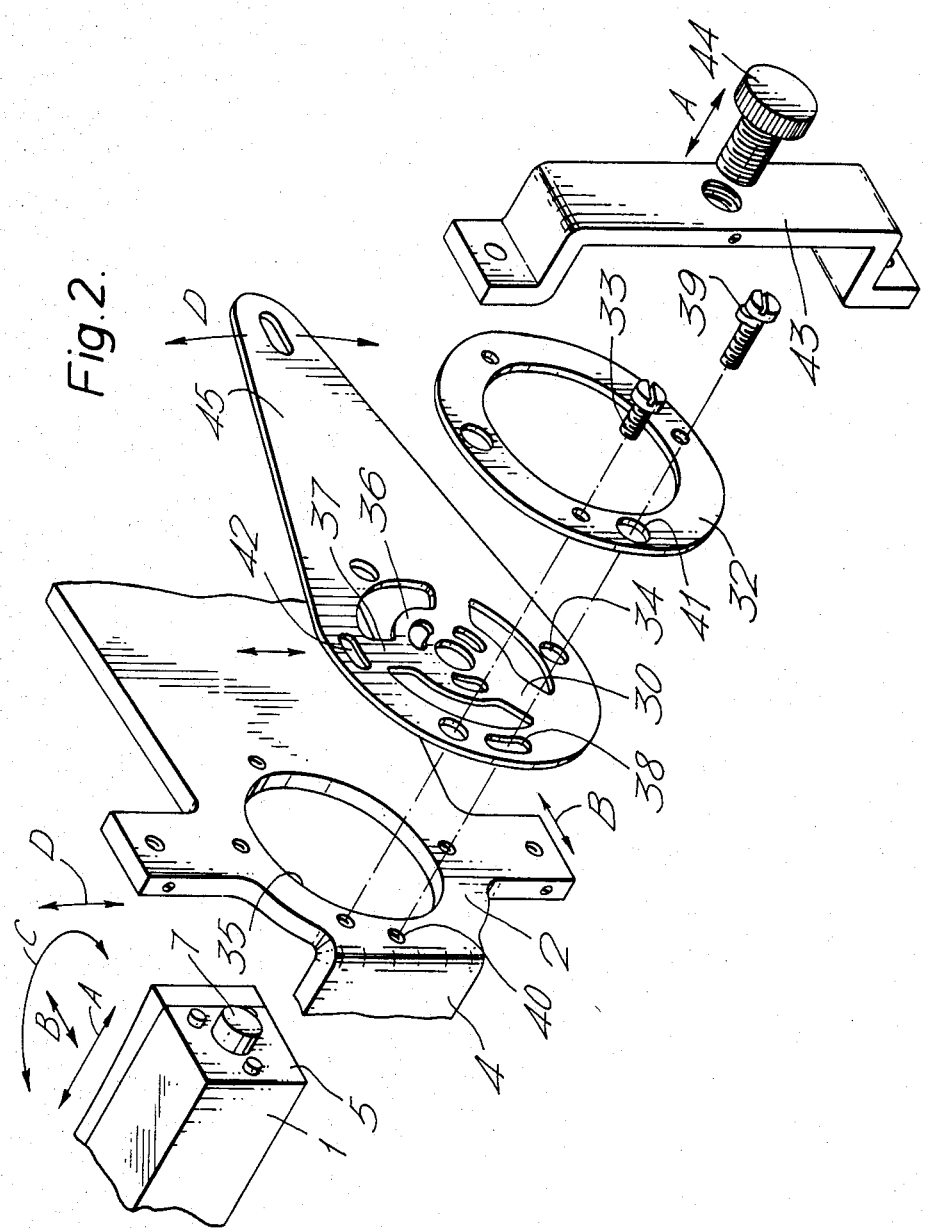
FIG. 2 is an exploded perspective view of part of a further embodiment from an opposite viewpoint.

Referring now to FIG. 2, the mirror 1 is again mounted between spaced webs of a carrier 4, only one web 2 being shown. It is to be noted that in FIG. 2 the assembly is viewed from an opposite viewpoint from that of FIG. 1. The mirror has spaced end regions, again only that referenced 5 is shown. From these end regions protrude co-axial spigots only one referenced 7 being illustrated. In this embodiment, these are primarily for location purposes but also serve to transmit end loads to the mirror during bodily adjustment.

For ease of description only one end of the assembly is now described; it will be appreciated that the other end is similar, if not identical.

The end 5 of the mirror 1 is carried by a location member basically in the form of a disc 30 with an outer peripheral region 31 arranged to be clamped after sliding adjustment to the web 2. Clamping is effected by a clamping ring 32 and screws 33 which extend through clearance holes 34 in the peripheral region 31 of the disc 30 into the web 2.

The web 2 is provided with an aperture 35 over which the disc 30 lies and through which the mirror can be axially inserted.

The disc 30 has an inner apertured boss region 36 into the aperture of which the spigot 7 protrudes when the boss region 36 is clamped to the end region 5 of the mirror. Flexible radially extending regions 37 connect the boss to the peripheral region.

To effect bodily displacement (by said first displacement means) of the mirror in the fore-and-aft sense, as shown by Arrow B, each disc, e.g. that referenced 30 is formed with a slot 38 through which extends an eccentric screw 39. This screw 39 is screwed into the web 2 at 40 and passes through a clearance hole 41 in the ring 32. Rotation of the eccentric screw 39 urges the disc 30 in a fore-and-aft sense thereby moving that end 5 of the mirror accordingly. If the discs at both ends are moved unison then naturally bodily fore-and-aft movement of the mirror 1 is effected, but naturally, if the discs are moved differentially then the mirror is moved in azimuth, that is to say as indicated by Arrow C.

Vertical adjustment can be similarly effected if desired by similar items operating at a slot referenced 42 set at 90° to the slot 38.

Angular displacement of the mirror is accommodated by flexure of the regions 37.

Bodily lateral displacement of the mirror, (by said second displacement means) as shown by Arrow A is effected by screw carrying brackets at each end, one being shown at 43, mounted upon the web 2 and shaped to clear the disc 30 and the clamping ring 32. The screw (44) carried by the bracket engages an end face of the spigot 7 and inward screwing urges the mirror away from the web 2. Similar items on the other end of the assembly cause movement toward the web 2. Flexure of the regions 37 accommodate this bodily movement.

Finally, to effect tilting (that is to say angular) adjustment of the mirror in the elevation sense, as shown by Arrow D, the disc 30 carries a lever arm 45 with a slotted aperture at its free end through which an eccentric adjusting screw extends into the web 2. Rotation of the disc 30 in consequence of screwing the adjusting screw is accommodated by the slotted holes and the clearance holes in the peripheral region 31.

Although illustrated as fully planar, naturally the flexible regions 37 of the disc 30 may have transverse (i.e. non-radial) corrugations to improve the accommodation of distortion.

We claim:

1. A mounting assembly including an optical element having an optically effective region and spaced end regions disposed laterally of said optically effective region, a carrier member having two spaced web regions between which the optical element lies and which carry first displacement means comprising twin location members, each slidably associated with one of said spaced web regions and cooperating with one end of said spaced end regions of the optical element for displacing said spaced end regions in the same sense as said spaced web regions to effect bodily fore-and-aft adjustment, second displacement means for displacing the optical element away from one of said spaced web regions toward the other of said spaced web region to effect bodily lateral adjustment, and tilting means comprising arm means for tilting the optical element with respect to said spaced web regions to effect angular adjustment in elevation, said twin location members of said first displacement means being capable of sliding differentially with respect to said spaced web regions to effect angular adjustment of the optical element in azimuth.

2. A mounting assembly according to claim 1 in which the connection between each location member and its associated end region of the optical element is effected by means of a spigot engaging in a part-spherical bearing.

3. A mounting assembly according to claim 2 in which the second displacement means comprises screw threaded regions on one spigot with nuts engaged therewith one on each side of the part-spherical bearing.

4. A mounting assembly according to claim 1 in which each location member comprises a generally planar member with an outer peripheral region slidably attached to an associated web region, an inner boss region attached to an adjacent end of the optical element, and flexible regions joining the inner and outer regions.

5. A mounting assembly according to claim 4 in which the second displacement means comprises screw means carried by a web member for urging the optical element bodily laterally, such movement being accommodated by distortion of the flexible regions of the location members.

6. A mounting assembly according to claim 1, wherein the tilting means includes arm means anchored so as to effect tilting in elevation of the optical element by angular movement relative to a web region.

* * * * *